US006862646B2

United States Patent
Bonola et al.

(10) Patent No.: US 6,862,646 B2
(45) Date of Patent: Mar. 1, 2005

(54) METHOD AND APPARATUS FOR ELIMINATING THE SOFTWARE GENERATED READY-SIGNAL TO HARDWARE DEVICES THAT ARE NOT PART OF THE MEMORY COHERENCY DOMAIN

(76) Inventors: Thomas J. Bonola, 2318 Timberbreeze Ct., Magnolia, TX (US) 77355; John E. Larson, 7711 Misty Fern Ct., Houston, TX (US) 77095; Sompong P. Olarig, 3050 Paseo Granada, Pleasonton, CA (US) 94566

( * ) Notice: Subject to any disclaimer, the term of this patent is extended or adjusted under 35 U.S.C. 154(b) by 494 days.

(21) Appl. No.: 10/034,464

(22) Filed: Dec. 28, 2001

(65) Prior Publication Data

US 2003/0126341 A1 Jul. 3, 2003

(51) Int. Cl.[7] ............................................... G06F 13/00
(52) U.S. Cl. ..................... 710/306; 710/312; 710/309; 710/240; 710/105; 710/220; 370/402; 711/711; 711/141
(58) Field of Search ................................. 710/306, 312, 710/112, 309, 240, 220, 105, 52; 711/141, 148, 119; 709/213, 214, 253, 250; 370/401, 402; 707/201; 385/100

(56) References Cited

U.S. PATENT DOCUMENTS

| | | | | |
|---|---|---|---|---|
| 5,113,514 A | * | 5/1992 | Albonesi et al. | 711/144 |
| 6,122,659 A | * | 9/2000 | Olnowich | 709/213 |
| 6,182,176 B1 | * | 1/2001 | Ziegler et al. | 710/112 |
| 6,304,932 B1 | * | 10/2001 | Ziegler et al. | 710/112 |

OTHER PUBLICATIONS

"Photonic architectures for distributed shared memory multiprocessors" by Dowd, P.W.; Chu, J. (abstract only) Publication Date: Apr. 26–27, 1994.*

* cited by examiner

Primary Examiner—Gopal C. Ray

(57) ABSTRACT

The specification discloses a method and related system that allows hardware devices to participate in the coherency domain of a computer system. More particularly, hardware devices such as network interface cards, audio cards, input/output cards, and the like, are allowed to participate on at least a limited basis in the coherency domain by having cache memory that duplicates a FIFO buffer in main memory used to exchange information between software and the hardware. To exchange information, software writes to the FIFO buffer which invalidates the data in the cache-type memory of the hardware device, and the invalidation message acts to notify the hardware device of the availability of information in the FIFO buffer.

68 Claims, 1 Drawing Sheet

METHOD AND APPARATUS FOR ELIMINATING THE SOFTWARE GENERATED READY-SIGNAL TO HARDWARE DEVICES THAT ARE NOT PART OF THE MEMORY COHERENCY DOMAIN

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The preferred embodiments of the present invention are generally related to increasing computer performance in the realm of software to hardware communications. More particularly, the preferred embodiments of the present invention are directed to a communication technique between software and hardware devices that informs downstream hardware devices that information is available in the system main memory with bounded latency.

2. Background of the Invention

In terms of availability and access to data in main memory, computer systems can be broken up into portions within the coherency domain, and portions outside the coherency domain. Some exemplary computer system components that would typically be within the coherency domain are microprocessor caches and the main memory. In a single microprocessor system, the difficulty of maintaining coherency of the microprocessor cache against main memory is relatively simple. Simplicity fades quickly however as multiple microprocessors are included in the computer system. Generally speaking, the cache of each microprocessor and the main memory array are kept coherent by the use of some form of cache coherency protocol, and the devices are thus within the same coherency domain.

As frequently happens in a computer system, software executed on one of the microprocessors needs to communicate command lists, data, or both to a downstream hardware device, most likely an input/output device such as a network interface card. In the related art devices, the exchange of command lists and/or data generally takes place by software executed within a microprocessor writing the commands and/or data to a first-in/first-out (FIFO) buffer in main memory. Once all or a significant portion of the commands and/or data have been placed in the FIFO buffer, the software sends a ready signal, also known as a doorbell, to the downstream hardware device indicating that the commands and/or data are available. Once the notification or doorbell has been received, the hardware device arbitrates for mastership of its associated bus, and reads the data from the buffer in main memory through known direct memory access techniques. In this way, the software is free to perform other steps, or the microprocessor may preempt that thread and execute other software threads, while the hardware device reads the commands and/or data, and executes the necessary steps. However, trends in software programming techniques inject the possibility of significant latency between placing of the commands and/or data in the FIFO buffer, and the doorbell notification arriving at the hardware device.

The standard paradigm in software to hardware communications over the last several years comprises one or more layers of abstraction between the software and the actual hardware device. That is, rather than the software having the capability of writing or communicating directly with the hardware device, software communicates with hardware through a driver program. Thus, it is the driver program or software that is responsible for protocol translations, handshaking, and the like, to move the commands and/or data from the software thread to the hardware. The advantage of this layer of abstraction from the programming point of view is that the software need only communicate with the appropriate driver, and hardware specific protocols and procedures are not a concern of the higher level program. Of course, the driver software, again just another program executed on the microprocessor, is still responsible for the communication process, including writing to the FIFO buffer and ringing the hardware doorbell as described above.

Recently, however, the trend has been to write software programs in "user-mode." In user-mode, communications between the software and hardware may take place without levels of abstraction, or may take place with one or more levels of abstraction using drivers in a non-prioritized (non-kernel) mode. Regardless of whether the user-mode software communicates directly with the hardware device, or through a level of abstraction being a driver for that hardware device, software makes the communication. Although any piece of software is susceptible to preemption in today's computer systems, non-kernel software is especially vulnerable to such preemption. By preemption it is meant that for reasons beyond control of the software stream, execution is stopped for a time so that other processes and procedures may take place. These interruptions may be attributable to interrupts directed to the microprocessor, but may also be preemption to execute software streams with higher priority. Regardless of the reason, preemption at the wrong time, with regard to the software-to-hardware communication, has the potential for creating unbounded latencies between placing commands and/or data, and notifying the hardware.

Consider a related art communication from software executed on a microprocessor to a hardware device by way of a FIFO buffer in main memory. Further consider that the software has the opportunity to write the commands and/or data into the FIFO, but before the software can ring the hardware doorbell (send the message across one or more bridge devices and expansion buses), the software is preempted for an extended period of time. In this situation, the commands and/or data are loaded, but the hardware has yet to act because it has not received notification.

Preemption between the loading of the FIFO and the ringing of the hardware doorbell is possible whether the program is a user-mode program, an abstracted level of user-mode communication, or even a kernel mode driver. Inopportune preemption, however, is more prevalent in the user-mode and abstracted user-mode communications.

Thus, what is needed in the art is a more efficient way to notify hardware that commands and/or data are available in the buffer that facilitates communication between the software running on a microprocessor in the coherent memory domain and the hardware.

BRIEF SUMMARY OF SOME OF THE PREFERRED EMBODIMENTS

The problems noted above are solved in large part by a system and related method whereby hardware devices are allowed to participate in the coherency domain, preferably on a limited basis. More particularly, the hardware devices are preferably equipped with a cache memory that duplicates a small subset of the main memory, that subset being the location of the FIFO buffer. This small cache type memory on the hardware device is preferably maintained coherent with the locations in main memory through the cache coherency protocol of the computer system. In this way, software programs need only load commands and/or data in the FIFO buffer in main memory (or more particularly write those locations in the caches of the microprocessors in which they execute), and the cache coherency protocol notifies the hardware device by invalidating the shared memory locations stored in the cache memory of the hardware device. The notification that commands and/or data are available for the hardware device is thus accomplished by means of the invalidate command of the cache coherency protocol.

Implementing notification in this manner, the hardware device need only poll its cache memory system, resident on the hardware device itself, until such time as a data invalidation occurs. Once invalid, the hardware device reads the updated data from the main memory and begins using the data or executing the commands.

While the hardware is described as having a cache memory system, this cache memory system need not necessarily be the fast cache memory normally used for microprocessors, but instead may be random access memory of some kind, or if the FIFO buffer is small enough, a series of registers. Thus, the preferred embodiments of the present invention overcome the problems of the potentially unbounded latency software doorbell signal by allowing the hardware devices to participate, on a limited basis, in the cache coherency protocol using the invalidation signal of the cache coherency system as the notification.

The disclosed device comprises a combination of features and advantages which enable it to overcome the deficiencies of the prior art devices. The various characteristics described above, as well as other features, will be readily apparent to those skilled in the art upon reading the following detailed description, and by referring to the accompanying drawing.

BRIEF DESCRIPTION OF THE DRAWINGS

For a detailed description of the preferred embodiments of the invention, reference will now be made to the accompanying drawing in which.

NOTATION AND NOMENCLATURE

Figure 1:
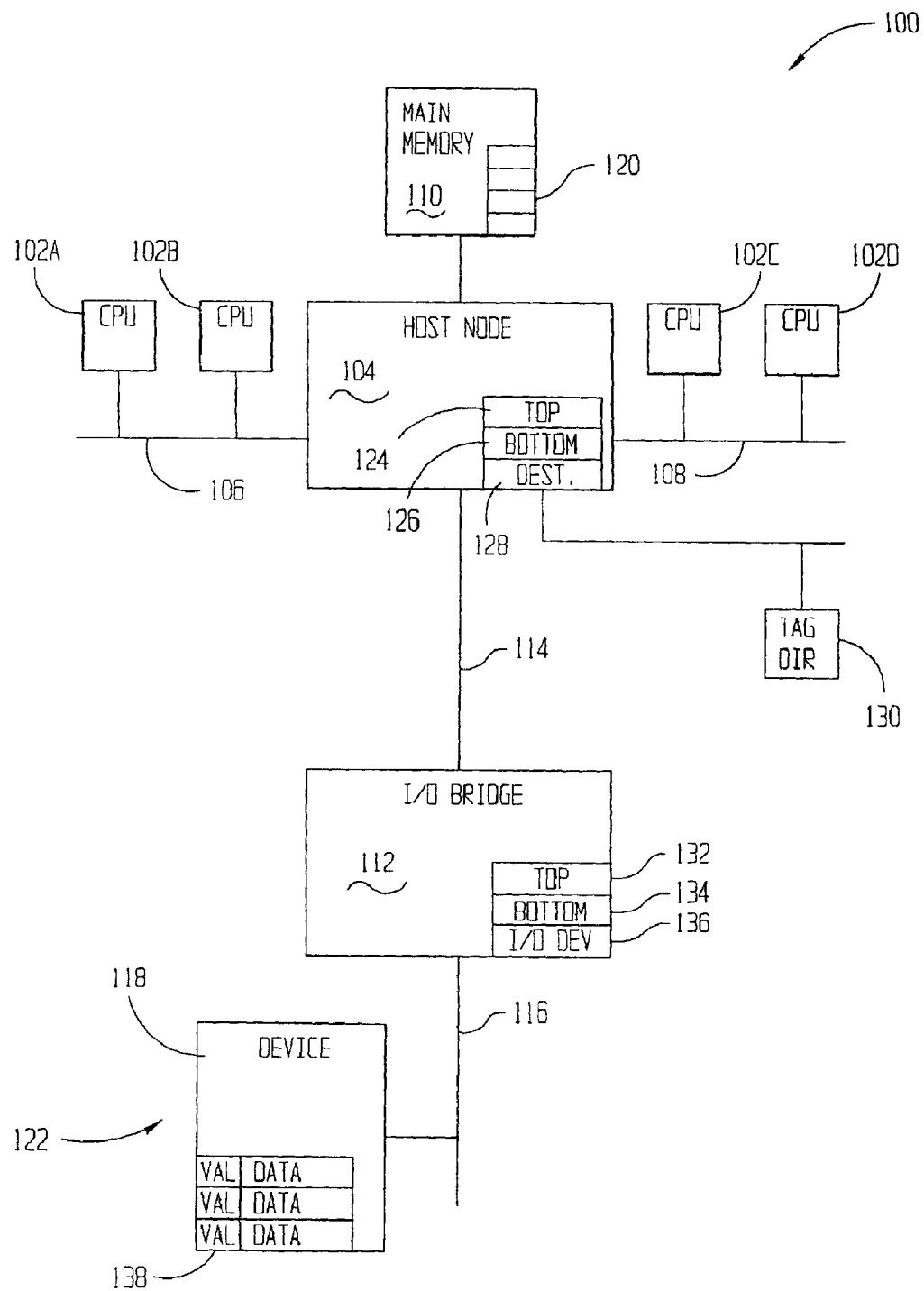
FIG. 1 shows an exemplary implementation of a system where a hardware device participates in the cache coherency domain.

Certain terms are used throughout the following description and claims to refer to particular system components. As one skilled in the art will appreciate, computer companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ". Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION OF THE PREFERRED EMBODIMENTS

FIG. 1 shows a computer system 100 constructed in accordance with the preferred embodiment. In particular, computer system 100 preferably comprises a plurality of microprocessors or central processing units 102A–D. Although only four such microprocessors 102 are shown in FIG. 1, the computer system 100 may comprise any number of microprocessors, and still be within the contemplation of this invention. Although having multiple microprocessors 102 is the preferred implementation, it would be possible to implement the techniques described herein in a single microprocessor 102, with cache coherency maintained between the single microprocessor's cache, the main memory, and the cache of the hardware device. Each of the microprocessors 102 preferably couples to a host node logic 104 by way of respective local buses 106 and 108. Inasmuch as the microprocessors 102 are preferably the same type, likewise the microprocessor buses 106 and 108 preferably implement the same bus protocol. The preferred microprocessors 102 are any of the 64 bit processors made by Intel®; however, any microprocessor capable of parallel operation in a computer system could be equivalently used.

The main memory array 110 preferably couples to the microprocessors 102 and the rest of the computer system 100 through the host node 104. The host node 104 preferably has a memory control unit (not shown) that controls transactions to the main memory array 110 by asserting the necessary control signals during memory accesses. The main memory array 110 comprises a memory device or array of memory devices in which program instructions and data may be stored. The main memory array 110 may comprise any suitable type of memory such as dynamic random access memory (DRAM) or any of the various types of DRAM devices such as synchronous (SDRAM), extended data output DRAM (EDO DRAM) or RAMBUS™ DRAM (RDRAM).

The preferred embodiments of the computer system 100 also comprises an input/output (I/O) bridge 112 coupled to the host node 104 by way of a primary expansion bus 114. Any suitable primary expansion bus 114 may be used, and thus various buses such as the Hublink bus proposed by Intel Corporation or a peripheral component interconnect (PCI) bus may be used as the primary expansion bus 114.

The input/output (I/O) bridge 112 preferably bridges the primary expansion bus 114 to one or more secondary expansion buses. In the preferred embodiment, the secondary expansion bus 116 is a PCI bus, or its improvement, the PCI-X bus. However, computer system 100 is not limited to any particular type or number of secondary expansion buses, and thus various buses may be used in the secondary capacity, including an industry standard architecture bus (ISA), a sub-ISA bus, a universal serial bus (USB), and IDE bus, an IEEE 1394 standard ("Firewire") bus, or any of a variety of other buses that are available or may become available in the future.

Although FIG. 1 only shows one host node 104 coupling the I/O devices to the central processing units 102, it must be understood that computer system 100 could also include a plurality of host nodes 104, each host node coupling a plurality of central processing units and each having a memory array 110 coupled thereto. Such a multiple host node computer system would further require a switch logic coupling the host nodes to the I/O bridge for information routing purposes.

FIG. 1 also shows a hardware device 118 coupled to the secondary expansion bus 116. This hardware device 118 could be any of a number of possible devices, including network interface cards, video cards, audio devices, data storage devices, system area network interfaces (e.g. Infini Band), storage area network interfaces (e.g. Fibre Channel) and any device capable of bus-mastering to and from the main memory array 110. Many of these hardware devices 118 need to communicate with programs executed on one or more of the microprocessors 102. While it is certainly possible to have the software stream communicate directly with the hardware device 118 by writing directly to the hardware device, the commands and/or data may be too lengthy for the hardware device 118 to accept at any one time, or there may be latency problems in the communication as discussed in the Background section. To combat this problem, the command lists and/or data are preferably placed in a first-in/first-out (FIFO) buffer 120, which may also be referred to as an exchange buffer, located in the main memory 110. The software stream merely places the commands and/or data in the FIFO buffer 120, and subsequently the hardware device arbitrates for a bus mastership of the secondary expansion bus 116 and reads the commands and/or data from the FIFO buffer 120. A discussion of how, in the preferred embodiment, the hardware device 118 is notified of the presence of commands and/or data in the FIFO buffer 120 requires a brief digression into memory coherency protocols.

In a system having multiple microprocessors 102, and preferably with each microprocessor having at least some cache memory (either internal, L1, cache memory and possibly external, L2, cache memory), there is a need to ensure cache coherency across all the caches for all the microprocessors with respect to the main memory, and vice versa. Consider for purposes of example a software stream executed on CPU 102A of FIG. 1. Further consider that the software stream updates a variable from main memory, a copy of which is present in the cache of the CPU 102A. By writing a new value to the cache memory location, the cache memory version becomes the only valid version within the system. Cache coherency protocols are responsible for propagating the new value to all the appropriate locations, or at least notifying other CPUs 102 that their copy (if they have one) of the parameter is invalid. While there may be several possible cache coherency protocols that could ensure this coherency, in the preferred embodiments the cache coherency protocol is a write-back invalidate protocol. In a write-back invalidate cache coherency protocol, each agent wanting to modify memory must seek and obtain modify rights prior to the modification of the memory location. In being granted modify rights by the coherency system, other shared copies of the memory location are invalidated. Consider for purposes of explanation a piece of memory shared between two microprocessors. In this initial state, the status of the memory location is shared valid in each microprocessor. Further consider that a first processor seeks to modify the memory location, and thus requests permission from the device implementing cache coherency for this permission, in the preferred embodiments host node 104. The host node 104 grants permission to modify the memory location (gives the requesting microprocessor exclusive ownership), and simultaneously invalidates other copies, in the exemplary case the duplicate held in the second microprocessor. The microprocessor having exclusive ownership may change the value of the memory location (or rather the version stored in the microprocessor's cache) at will. It is not until the memory location is evicted from the requesting processor's cache, or some other device (the second microprocessor or other device capable of running memory transactions) requests the data at the memory location, that the updated value is written back to main memory. A write-back invalidate cache coherency protocol is preferred because write through cache protocols, requiring each cache line modification to be written back to main memory, are not compatible with the 64 bit machines offered by Intel®.

It is standard in the industry to define a coherency domain to comprise all devices within the computer system that receive an invalidation notice for copies of data which they contain. It is clear that the microprocessors all operate within the same coherency domain, preferably maintained by the host node logic 104. Other devices, such as hardware device 118 coupled to the secondary expansion bus 116, have traditionally not been allowed to participate in the coherency domain of the microprocessors. However, the preferred embodiments of this invention are directed generally to allow hardware devices, such as the hardware device 118, to participate in the coherence domain with respect to the FIFO buffer 120.

In the preferred embodiments the hardware device 118 has an onboard cache memory 122 (hereinafter cache 122). This cache 122 preferably duplicates information stored in the FIFO buffer 120 of the main memory 110. In broad terms, the cache memory on the hardware device is treated like a cache memory in one of the microprocessors 102, and is kept coherent therewith. Thus, if a software stream executed in one of the microprocessors 102 updates or places commands and/or data in the FIFO buffer 120, the cache coherency protocol, preferably implemented in the host node logic 104, sends invalidation messages to the hardware device 118 indicating the invalidation of one or more cache lines, preferably 128 bytes of data, duplicated in the cache 122. Upon receiving the notification that a cache line has been invalidated, the hardware device 118 preferably arbitrates for bus mastership of the secondary expansion bus 116, and reads the new data from the main memory 110 FIFO buffer 120. Thus, notification that commands and/or data are available with the bounded latency of the invalidation commands of the cache coherency protocol. Software need only be concerned with writing the commands and/or data into the FIFO buffer 120. The cache coherency protocol is responsible for sending invalidate commands to the hardware device 118, which the hardware device 118 uses as a notification that commands and/or data are available.

More particularly, the host node logic 104 preferably has a series of registers 124, 126 and 128. The registers 124, 126, 128 preferably identify the top of the FIFO buffer, the bottom of the FIFO buffer, and a destination respectively. The top 124 and the bottom 126 registers indicate the range in main memory of the location of the FIFO buffer 120. Inasmuch as the FIFO buffer 120 is preferably a linearly addressed set of memory locations within the main memory 110, the location may be completely and uniquely identified by having the top address and bottom address. Alternatively, the register 124 could contain a starting address, and register 126 could contain an offset indicating the length of the FIFO buffer. Operation of the registers 124, 126 and 128 of the preferred embodiment is best described with regard to an exemplary write of information to the FIFO buffer 120. In particular, consider a software stream executed on one of the microprocessors, for example microprocessor 102A. Further assume that the microprocessor 102A does not have a copy of the FIFO buffer 120 in its onboard cache (not shown). Thus, the microprocessor 102A copies portions of, or the entire, FIFO buffer from the main memory 110 to be placed in its cache. Further, because the software intends to update these locations, the microprocessor 102A requests of the cache coherency protocol exclusive ownership of those memory locations. Preferably, the host node 104 compares the addresses for which the microprocessor 102A requests exclusive ownership to the top and bottom registers 124 and 126 respectively. Because all or a part of the FIFO buffer 120 is preferably duplicated in the cache memory system in the hardware device 118, this comparison of the addresses to the registers 124 and 126 preferably reveals that the hardware device 118 likewise has copies of these location. The cache coherency protocol preferably simultaneously grants exclusive ownership of the memory locations to the requesting microprocessor 102A, and invalidates the copies held in the hardware device 118 by sending in an invalidate command to the location identified by the destination register 128.

In the preferred embodiments, the destination register 128 identifies the I/O bridge 112. Upon receiving the invalidate command from the host node 104, the I/O bridge 112 compares the addresses of the invalidate command to its top and bottom registers 132 and 134 respectively. These registers are preferably beginning address and ending address respectively, but may also be a beginning address and an offset. Preferably, these registers indicate that the device indicated in register 136 is the hardware device that contains the duplicate copies, and the invalidation is relayed across the secondary expansion bus 116 to the indicated hardware device, in this case hardware device 118. This invalidation command preferably changes the state of the valid bit 138 for each cache in the cache memory 122 of the hardware device 118 for which the invalidation command pertains. At this point, the microprocessor 102A, having exclusive ownership, is free to repeatedly change or add to those cached main memory locations. Whether by eviction of the relevant data by the microprocessor 102A, or a request to read that data from the hardware device 118, the microprocessor preferably writes the updated data to the main memory locations holding the FIFO buffer 120.

The hardware device 118 of the preferred embodiments, rather than continuously polling the actual main memory FIFO buffer 120, polls its cache looking for valid commands and/or data. Because the hardware device participates in the cache coherency domain, the hardware device 118 need only look at the version within its cache memory 122. As soon as that hardware device 118 polls the data in its cache 122 and sees that it is invalid (as caused by the invalidate command propagating down from the host node logic 104), the hardware device preferably arbitrates for ownership of the secondary expansion bus 116, and reads the new data from the main memory 110 FIFO buffer 120. After the data resides within the hardware device's cache 122, the device performs the command specified or operate on the data as required. Thus, the invalidate command sent by the host node logic 104 acts as the notification to the hardware device 118 that commands and/or data are available in the FIFO buffer 120.

Communication of data from the hardware device 118 to the software stream preferably takes place through a buffer in main memory. In particular, the hardware device places data, through its bus-mastering and direct memory access capabilities, in a second FIFO buffer (not specifically shown) in the main memory 110. By polling the next memory location, the software determines when the data transfer has taken place. Thus, the hardware device does not cache this second FIFO buffer in the preferred embodiments.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A computer system comprising:
   a plurality of microprocessors, each microprocessor having a cache;
   a main memory array, a portion of the main memory array designated as a first-in/first-out (FIFO) buffer;
   a first bridge device coupling the plurality of microprocessors and the main memory array, the first bridge device at least partially responsible for implementing a cache coherency protocol to keep the cache of each microprocessor and the main memory coherent;
   a second bridge device coupled to the first bridge device by way of a primary expansion bus;
   a hardware device coupled to the second bridge device by a secondary expansion bus, wherein the hardware device has a cache memory that duplicates a portion of the FIFO buffer, and wherein the hardware device cache memory is kept coherent by way of the cache coherency protocol.

2. The computer system as defined in claim 1 further comprising:
   at least one of the plurality of microprocessors executing a software stream; and
   said software stream configured to pass bytes of information to the hardware device by only placing the bytes of information in the FIFO buffer.

3. The computer system as defined in claim 2 further comprising said hardware device polls the cache memory that duplicates portions of the FIFO to check for availability of bytes of information from the software stream.

4. The computer system as defined in claim 1 wherein the FIFO buffer of the main memory array further comprises a set of continuously addressed memory locations.

5. The computer system as defined in claim 4 wherein the FIFO buffer further comprises at least one cache line of memory locations.

6. The computer system as defined in claim 5 wherein the cache line of memory locations is 128 bytes in length.

7. The computer system as defined in claim 1 wherein the first bridge device further comprises:
   a first register identifying a beginning location of the FIFO buffer that is duplicated by the cache memory of the hardware device;
   a second register identifying an end location of the FIFO buffer that is duplicated by the cache memory of the hardware device;
   a destination register identifying a location of the hardware device; and
   wherein the first bridge logic, as part of the cache coherency protocol, compares transactions to addresses in main memory to the first register and the second register to determine if the transaction is directed to a memory location duplicated by the onboard cache memory of the hardware device.

8. The computer system as defined in claim 7 wherein the cache coherency protocol further comprises a write-back invalidate cache protocol.

9. The computer system as defined in claim 7 wherein the first register contains an address of a first memory location of the FIFO buffer.

10. The computer system as defined in claim 9 wherein the second register contains an address of a last memory location of the FIFO buffer.

11. The computer system as defined in claim 9 wherein the second register contains an offset representing the number of memory locations a last address of the FIFO buffer resides from the first memory address.

12. The computer system as defined in claim 1 wherein the second bridge device further comprises:
a first register identifying a first cached memory address;
a second register identifying a second cached memory address;
a third register identifying the hardware device;
wherein the first and second registers identify a series of continuous memory addresses of the main memory cached by the hardware device identified in the third register; and
wherein the second bridge device receives cache coherency protocol messages, compares addresses of the cache coherency protocol messages to the first and second registers, and forwards the messages to the device identified in the third register.

13. The computer system as defined in claim 12 wherein the first register contains an address of a first memory location of the FIFO buffer.

14. The computer system as defined in claim 13 wherein the second register contains an address of a last memory location of the FIFO buffer.

15. The computer system as defined in claim 13 wherein the second register contains an offset representing the number of memory locations a last address of the FIFO buffer resides from the first memory address.

16. The computer system as defined in claim 1 wherein the hardware device coupled to the second bridge device by the secondary expansion bus further comprises a hardware device capable of bus-mastering the secondary expansion bus.

17. The computer system as defined in claim 16 wherein the hardware device further comprises a network interface card.

18. The computer system as defined in claim 17 wherein the network interface card further comprises a system area network interface card.

19. The computer system as defined in claim 18 wherein the system area network interface card further comprises an Infini Band compatible interface card.

20. The computer system as defined in claim 17 wherein the network interface card further comprises a storage area network interface card.

21. The computer system as defined in claim 20 wherein the network interface card further comprises a Fibre Channel compatible interface card.

22. The computer system as defined in claim 16 wherein the hardware device further comprises a graphics adapter.

23. The computer system as defined in claim 16 wherein the hardware device further comprises an audio input/output card.

24. The computer system as defined in claim 16 wherein the hardware device further comprises a mass storage device.

25. The computer system as defined in claim 24 wherein the mass storage device further comprises a hard drive.

26. The computer system as defined in claim 24 wherein the mass storage device further comprises a compact disk drive.

27. The computer system as defined in claim 1 wherein the cache memory that duplicates a portion of the FIFO memory in the hardware device further comprises a random access memory configured to operate as the cache memory.

28. The computer system as defined in claim 1 wherein the cache memory that duplicates a portion of the FIFO memory in the hardware device further comprises a series of hardware registers.

29. A method comprising:
allowing a hardware device, coupled to a microprocessor and main memory by way of a bridge device, to participate in a coherency domain of a computer system by the hardware device having a coherent cache memory duplicating a cache line of a FIFO buffer of the main memory;
writing information to the cache line of the FIFO buffer by a software stream; and
notifying the hardware device that the information is available in the FIFO buffer by invalidating the duplicate copy of the cache line of the FIFO buffer in the onboard cache memory of the hardware device.

30. The method as defined in claim 29 further comprising obtaining a copy of the cache line by the hardware device after receiving the invalidation command.

31. The method as defined in claim 29 further comprising transferring response information from the hardware device to the software stream by the hardware device writing the response information to a second first-in/first-out (FIFO) buffer in the main memory array.

32. A method of notifying a hardware device in a computer system that information from a software stream executed by a microprocessor is available in a main memory array first-in/first-out (FIFO) buffer, the method comprising:
allowing the hardware device to participate in a coherency domain of the computer system by the hardware device having a coherent cache memory duplicating a cache line of the FIFO buffer;
writing information to the cache line of the FIFO buffer by the software stream, comprising:
requesting exclusive ownership of the cache line by a microprocessor executing the software stream;
granting exclusive ownership of the cache line to the microprocessor by a cache coherency system; and
writing the cache line once exclusive ownership of the cache line is granted to the microprocessor;
notifying the hardware device that the information is available in the FIFO buffer by invalidating the duplicate copy of the cache line of the FIFO buffer in the onboard cache memory of the hardware device.

33. The method as defined in claim 32 wherein notifying the hardware device that the information is available in the FIFO buffer further comprises invalidating the duplicate copy of the cache line in the cache memory of the hardware device substantially simultaneously with the granting exclusive ownership step.

34. The method as defined in claim 33 wherein invalidating the duplicate copy of the cache line further comprises sending an invalidation message from the cache coherency system to the hardware device to invalidate the copy of the cache line in the cache memory of the hardware device.

35. A method of notifying a hardware device in a computer system that information from a software stream executed by a microprocessor is available in a main memory array first-in/first-out FIFO buffer, the method comprising:
allowing the to participate in a coherency domain of the computer system by the hardware device having a coherent cache memory duplicating a cache line of the FIFO buffer;
writing information to the cache line of the FIFO buffer by the software stream; and notifying the hardware device that the information is available in the FIFO buffer by invalidating the duplicate copy of the cache line of the FIFO buffer in the onboard cache memory of the hardware device;

obtaining a copy of the cache line by the hardware device after receiving an invalidation command by;

arbitrating by the hardware device for mastership of a secondary expansion bus; and reading the cache line of the FIFO buffer into the cache memory.

36. A method of notifying a hardware device in a computer system that information from a software stream executed by a microprocessor is available in a main memory array first-in/first-out (FIFO) buffer, the method comprising:

allowing the hardware device to participate in a coherency domain of the computer system by the hardware device having a coherent cache memory duplicating a cache line of the FIFO buffer;

writing information to the cache line of the FIFO buffer by the software stream; and notifying the hardware device that the information is available in the FIFO buffer by invalidating the duplicate copy of the cache line of the FIFO buffer in the onboard cache memory of the hardware device, the notifying further comprising:

polling by the hardware device of the cache memory; and receiving notification that the information is available in the FIFO buffer based on the hardware device sensing that the cache line of the FIFO buffer in the cache is invalid.

37. A computer system comprising:

a means for executing software programs, the means for executing having a cache means;

a means for providing program and data storage, a portion of the means for providing program and data storage designated a buffer means for providing data exchange;

a first means for bridging the means for executing and the means for providing program and data storage, the first means for bridging also for implementing at least a portion of a cache coherency protocol to keep the cache means and the means program and data storage coherent;

a second means for bridging that provides protocol translation between a first means for communicating data and a second means for communicating data, the first means for communicating data coupling the first means for bridging to the second means for bridging; and a means for providing hardware specific tasks, the means for providing hardware specific tasks coupled to the second bridge means for bridging, wherein the means for providing hardware specific tasks has a means for duplicating a portion of the buffers means, and wherein the means for duplicating a portion of the buffers means is kept coherent by way of the cache coherency protocol.

38. The computer system as defined in claim 37 wherein the buffer means further comprises a first-in/first-out (FIFO) buffer.

39. The computer system as defined in claim 38 further comprising said means for providing hardware specific tasks polls the cache means that duplicates the portion of the buffer means to check for availability of bytes of information from the software stream.

40. The computer system as defined in claim 37 wherein the FIFO buffer of the means for providing program and data storage further comprises a set of continuously addressed memory locations in the means for providing program and data storage.

41. The computer system as defined in claim 40 wherein the FIFO buffer further comprises at least one cache line of memory locations.

42. The computer system as defined in claim 41 wherein the cache line of memory locations is $2^N$ bytes in length, where N is an integer.

43. The computer system as defined in claim 37 wherein the first means for bridging further comprises:

a first means for storing an indication of a beginning location of the buffer means that is duplicated in the cache means of the means for providing hardware specific tasks;

a second means for storing an indication of an end location of the buffer means that is duplicated in the cache means of the means for providing hardware specific tasks;

a third register means for storing an address identifying a location of the means for providing hardware specific tasks; and wherein the first means for bridging, as part of the cache coherency protocol, compares transactions to addresses in the means for providing program and data storage to the first means for storing an indication and the second means for storing an indication to determine if the transaction is directed to a memory location cached by the means for providing hardware specific tasks.

44. The computer system as defined in claim 43 wherein the cache coherency protocol further comprises a write-back invalidate cache protocol.

45. The computer system as defined in claim 43 wherein the first means for storing an indication contains an address of a first memory location of the buffer means.

46. The computer system as defined in claim 45 wherein the second means for storing an indication contains an address of a last memory location of the buffer means.

47. The computer system as defined in claim 45 wherein the second means for storing an indication contains an offset representing the number of memory locations a last address of the buffer means resides from the first memory address.

48. The computer system as defined in claim 31 wherein the second means for bridging further comprises:

a first means for storing a value identifying a first cached memory address;

a second means for storing a value identifying a second cached memory address;

a third means for storing a value identifying the means for providing hardware specific tasks;

wherein the first and second means for storing a value identify a series of continuous memory addresses of the means for providing program and data storing duplicated by the means for providing hardware specific tasks; and wherein the second means for bridging receives cache coherency protocol messages, compares addresses of the cache coherency protocol messages to the values in the first and second means for storing a value, and forwards the messages to the device identified in the third means for storing a value if the addresses fall within the values.

49. The computer system as defined in claim 48 wherein the first means for storing a value contains an address of a first memory location of the buffer means.

50. The computer system as defined in claim 49 wherein the second means for storing a value contains an address of a last memory location of the buffer means.

51. The computer system as defined in claim 49 wherein the second means for storing a value contains an offset representing the number of memory locations a last address of the buffer means resides from the first memory address.

52. The computer system as defined in claim 37 wherein the software stream executed by the means for executing is configured to pass bytes of information to the means for providing hardware specific tasks by only by placing the bytes of information in the buffer means.

53. The computer system as defined in claim 37 wherein the means for providing hardware specific tasks coupled to the second means for bridging by the second means for communicating is capable of bus-mastering the second means for communicating.

54. The computer system as defined in claim 53 wherein the means for providing hardware specific tasks further comprises a network interface card.

55. The computer system as defined in claim 54 wherein the network interface card further comprises a system area network interface card.

56. The computer system as defined in claim 55 wherein the system area network interface card further comprises an Infini Band compatible device.

57. The computer system as defined in claim 54 wherein the network interface card further comprises a storage area network interface card.

58. The computer system as defined in claim 57 wherein the storage area network interface card further comprises a Fibre Channel compatible device.

59. The computer system as defined in claim 53 wherein the means for providing hardware specific tasks device further comprises a graphics adapter.

60. The computer system as defined in claim 53 wherein the means for providing hardware specific tasks further comprises an audio input/output card.

61. The computer system as defined in claim 53 wherein the means for providing hardware specific tasks further comprises a mass storage device.

62. The computer system as defined in claim 61 the mass storage device further comprises a hard drive.

63. The computer system as defined in claim 61 the mass storage device further comprises a compact disk drive.

64. The computer system as defined in claim 37 wherein the means for duplicating a portion of the buffer means in the means for providing hardware specific tasks further comprises a random access memory configured to operate as a cache memory.

65. The computer system as defined in claim 37 wherein the means for duplicating a portion of the buffer means in the means for providing hardware specific tasks further comprises a series of hardware registers configured to operate as a cache memory.

66. A computer system comprising:

a microprocessor having a cache;

a main memory array, a portion of the main memory array designated as a first-in/first-out (FIFO) buffer;

a first bridge device coupled to the microprocessor by way of a first bus, and the first bridge device coupled to the main memory array by way of a second bus, the first bridge device at least partially responsible for implementing a cache coherency protocol to keep the cache of the microprocessor and the main memory coherent;

a hardware device coupled to the first device by a primary expansion bus, wherein the hardware device has a cache memory that duplicates a portion of the FIFO buffer, and wherein the hardware device cache memory is kept coherent by way of the cache coherency protocol.

67. The computer system as defined in claim 66 further comprising:

wherein the microprocessor executes a software stream; and said software stream passes bytes of information to the hardware device only by placing the bytes of information in the FIFO buffer.

68. The computer system as defined in claim 67 further comprising said hardware device polls the cache memory that duplicates portions of the FIFO to check for availability of bytes of information from the software stream.

* * * * *

UNITED STATES PATENT AND TRADEMARK OFFICE
CERTIFICATE OF CORRECTION

PATENT NO. : 6,862,646 B2 Page 1 of 1
APPLICATION NO. : 10/034464
DATED : March 1, 2005
INVENTOR(S) : Thomas J. Bonola et al.

It is certified that error appears in the above-identified patent and that said Letters Patent is hereby corrected as shown below:

IN THE CLAIMS

Claim 35, Column 10, line 62, after "allowing the" insert --hardware device--

Signed and Sealed this

Fifteenth Day of September, 2009

David J. Kappos
*Director of the United States Patent and Trademark Office*